United States Patent
Gu et al.

(10) Patent No.: US 6,800,203 B2
(45) Date of Patent: Oct. 5, 2004

(54) CATALYTIC DESTRUCTION OF PERCHLORATE IN FERRIC CHLORIDE AND HYDROCHLORIC ACID SOLUTION WITH CONTROL OF TEMPERATURE, PRESSURE AND CHEMICAL REAGENTS

(75) Inventors: Baohua Gu, Oak Ridge, TN (US); David R. Cole, Knoxville, TN (US); Gilbert M. Brown, Knoxville, TN (US)

(73) Assignee: U.T. Battelle, Oak Ridge, TN (US)

( * ) Notice: Subject to any disclaimer, the term of this patent is extended or adjusted under 35 U.S.C. 154(b) by 196 days.

(21) Appl. No.: 10/157,407

(22) Filed: May 29, 2002

(65) Prior Publication Data

US 2003/0222031 A1 Dec. 4, 2003

(51) Int. Cl.[7] .............................. C02F 1/28; C02F 1/70
(52) U.S. Cl. ..................... 210/677; 210/757; 210/902; 423/476
(58) Field of Search ................................ 210/670, 677, 210/747, 749, 757, 902; 423/476; 588/248; 405/128.5, 128.55, 128.6, 128.75, 128.8, 128.85

(56) References Cited

U.S. PATENT DOCUMENTS

| | | | |
|---|---|---|---|
| 4,198,209 A | * 4/1980 | Frosch et al. ............... | 23/302 R |
| 6,066,257 A | * 5/2000 | Venkatesh et al. .......... | 210/615 |
| 6,077,432 A | * 6/2000 | Coppola et al. ............. | 210/611 |
| 6,358,396 B1 | * 3/2002 | Gu et al. ..................... | 205/704 |
| 6,419,837 B1 | * 7/2002 | Akse ........................... | 210/752 |
| 6,448,299 B1 | * 9/2002 | Brown et al. ................ | 521/26 |
| 6,531,065 B2 | * 3/2003 | Gurol et al. ................. | 210/669 |

OTHER PUBLICATIONS

Li et al., Final Report: Hydrothermal/Thermal Decomposition of Perchlorate, *National Center for Environmental Research, Office of Research and Development, U.S. Environmental Protection Agency, Star Program*, 3 pages, Sep. 1999–Mar. 2000.

Everett et al., Properties of Perchloric Acid Solution, *Handbook of Laboratory Safety*,, Section 4.5.6, 11 pgs.

Gu et al., Regeneration of Perchlorate ($ClO_4^-$) –Loaded Anion Exchange Resins by a Novel Tetrachloroferrate ($FeCl_4^-$) Displacement Technique, *Environmental Science Technology* 2001, 35, pp. 3363–3368.

Urbansky, Implications for Analysis and Remediation *Perchlorate Chemistry*:, pp. 81–95.

Gu et al., Efficient Treatment of Perchlorate ($ClO_4^-$)— Contaminated Groundwater with Bifunctional Anion Exchange Resins, *Presented at 218th National Meeting of the American Chemical Society*, Aug. 22–24, 1999, New Orleans, LA.

Glen et al., Bio–Degradaton of Ammonium Perchlorate, Nitrate, Hydrolysates and Other energetic Materials, *U.S. patent No. 6,077,432, Abstract*, 1 pg.

\* cited by examiner

Primary Examiner—Frank M. Lawrence
(74) Attorney, Agent, or Firm—J. Herbert O'Toole; Nexsen Pruet LLC

(57) ABSTRACT

A method is described to decompose perchlorate in a $FeCl_3$/HCl aqueous solution such as would be used to regenerate an anion exchange resin used to remove perchlorate. The solution is mixed with a reducing agent, preferably an organic alcohol and/or ferrous chloride, and can be heated to accelerate the decomposition of perchlorate. Lower temperatures may be employed if a catalyst is added.

13 Claims, 4 Drawing Sheets

CATALYTIC DESTRUCTION OF PERCHLORATE IN FERRIC CHLORIDE AND HYDROCHLORIC ACID SOLUTION WITH CONTROL OF TEMPERATURE, PRESSURE AND CHEMICAL REAGENTS

STATEMENT REGARDING FEDERALLY SPONSORED RESEARCH

This invention was made with United States Government support under Contract No. DE-AC05-00OR22725 between the United States Department of Energy and UT-BATTELLE, LLC and the United States Government has certain rights in this invention.

BACKGROUND OF THE INVENTION

1. Field of the Invention

This invention relates to a method for the destruction of perchlorate in a ferric chloride and hydrochloric acid aqueous regenerant solution used for the regeneration of anion exchange resins when the latter of which have been used for ground water remediation. More particularly, it relates to a destruction technique for perchlorate that does not change the chemical properties of the ferric chloride and hydrochloric acid regenerant solution accomplished by using controlled temperature/pressure and chemical reagents. The regenerated elution mixture may then be recycled or reused for the regeneration of anion-exchange resins loaded with perchlorate.

2. Background of the Art

Perchlorate ($ClO_4^-$) has been widely used as a rocket propellant and in munitions in the United States and abroad, and improper disposal of perchlorate-containing materials has resulted in a significant new threat to groundwater and drinking water supplies. Its distribution is widespread, as documented by Damian, *Environmental Protection*, Jun. 24, 1999, and Urbansky, *Bioremediation Journal* 2, 81 (1998). Because $ClO_4^-$ ions are nonvolatile, highly soluble, and kinetically inert in dilute aqueous solution, they cannot be effectively removed from water by conventional carbon filtration or sedimentation methodologies or by chemical reduction with reducing agents commonly used for environmental remediation such as elemental iron or dithionite. On the other hand, treatment by ion exchange, using highly selective anion exchange resins in particular, has proven to be an effective technology for removing $ClO_4^-$, especially at low concentrations. The ion-exchange technique has been viewed by many as the preferred method for the removal of perchlorates, and various resins have been studied for removal of perchlorates. For example, Kawaski et al., *Radiochimica Act* 63, 53 (1993) reported adsorption on DOWEX™ 1-X8. Gu et al., in *Perchlorate in the Environment*, pp 165–176 (2000) found that one bed volume of a bifunctional resin (Purolite™ D-3696) was able to treat>100,000 bed volumes of groundwater before a significant breakthrough of $ClO_4^-$ occurred (with an initial $ClO_4^-$ concentration of~50 μg/L or~0.5 μM/L).

Once the resin reaches its loading capacity, the spent resin is regenerated for reuse. In other words, the entire treatment process involves the use of selective anion exchange resins to remove prechlorate in water and the regeneration of spent resin bed. However, because $ClO_4^-$ anions are selectively and strongly sorbed as a result of their low hydration energy and large size, regeneration of spent resin becomes a particularly challenging and costly task. Indeed, a major operating cost for the ion exchange process is the disposal of spent regenerant solution. For example, Calgon Carbon Corporation's ISEP process produces approximately 1% of the volume of the treated groundwater as regenerant wastes (NaCl brine), which must be disposed of. The combined brine and its disposal costs are well over $350 per acre foot of water treated on the basis of a 1% rejection rate.

Our previous U.S. patent application (Ser. No. 09/491,242, now U.S. Pat. No. 6,448,299), incorporated herein by reference, disclosed a novel methodology to regenerate spent perchlorate-loaded resins using a combination of ferric chloride and hydrochoric acid solutions (Gu et al., Environ. Sci. Technol. 35, 3363–3368, 2001; Gu et al., Remediation, Marh 2002). Tetrachloroferrate ($FeCl_4-$) anions, formed in a solution of ferric chloride and hydrochloric acid (e.g., 1 M $FeCl_3$ and 4 M HCl), were found to effectively regenerate spent resins loaded with perchlorate. A mass-balance analysis indicated that nearly 100% recovery of ion-exchange sites was achieved by washing with as little as ~2 bed volumes of the regenerant solution in a column flow-through experiment. There was no significant deterioration of the resin's performance with respect to $ClO_4$ removal after repeated loading and regeneration cycles. Our new regeneration method produces regenerant waste of less than 0.005% volume of the treated groundwater and, therefore, offers a more cost-effective means to regenerate $ClO_4$ loaded resins with improved regeneration efficiency, recovery, and waste minimization than conventional NaCl brine regeneration techniques.

However, despite the fact that our new regeneration technique offers greatly improved efficiency and waste minimization of the volume of the regenerant, the production of hazardous perchlorate-containing waste regenerant solutions, and their disposal, remain to be issues of great concern. The need exists, therefore, for a method to completely destroy perchlorate in the ferric chloride-hydrochloric acid regenerant solutions and, more importantly, to allow the reuse of the regenerant solution. The methodology must not change the properties of the regenerant solution so that the solution can be reused in many regeneration cycles. Ideally, the perchlorate-destraction process is efficient and cost-effective, while not being subject to difficult-to-maintain operating conditions, nor generating any secondary wastes. The method should also be suitable for both the treatment of large aquifers or bodies of standing water as well as for localized facilities to provide potable water on site.

Li and Coppola, EPA STAR Report, 2000, disclosed a hydrothermal/thermal technique to decompose perchlorate in a 7% NaCl brine solution with added reducing agents and promoters. They reported that only partial destruction of perchlorate could be obtained by the additions of ferric salts to sodium chloride brine and essentially no perchlorate decomposition was obtained with or without other promoting agents. Their Integrated Thermal Treatment Process included a reverse osmosis step to concentrate the brine and the nitrate and sulfate rejection systems, but the process is believed to be ineffective for the destruction of perchlorate in the ferric chloride and hydrochloric acid solution used in the process of U.S. Pat. No. 6,448,299.

BRIEF SUMMARY OF THE INVENTION

It is an object of this invention to provide a method for the decomposition of perchlorate eluted from an anion exchange column using a ferric chloride and hydrochloric acid regenerant solution. It is a further objective of this invention to provide a process for recovering and recycling a regenerant solution used to regenerate a spent anion exchange column which has been used to remove perchlorate from water. It is yet a further objective of this invention to provide a system for routinely regenerating an anion exchange column used for perchlorate removal and to recycle the regenerant solution in a cost efficient manner.

These and other objects of this invention may be achieved by a process which removes perchlorate and regenerant from an anion exchange column, introduces a small quantity of non-toxic organic solvent (0 to 5% vol/vol preferably <2% vol/vol) ferrous ions, 0.01 to 20% wt/vol) and/or a catalyst to the mixture, provides sufficient energy to drive a redox reaction to completion, and purges and holds the regenerant for recycle. More specifically, the eluted perchlorate together with regenerant $FeCl_3$/HCl solution are diverted to a reactor vessel, (either a batch reactor or a continuous flow-through system), mixed with an organic solvent or a catalyst and maintained at a relatively low temperature (from ambient up to ~300° C.) and pressure (generally <500 psi) that is sufficient to decompose perchlorate. Ferrous chloride and organic alcohols are preferred chemical reagents in view of availability, cost, and effectiveness. Subsequently, the solution is cooled and ready for reuse when a resin column needs regeneration.

DETAILED DESCRIPTION OF THE INVENTION

Figure 1:
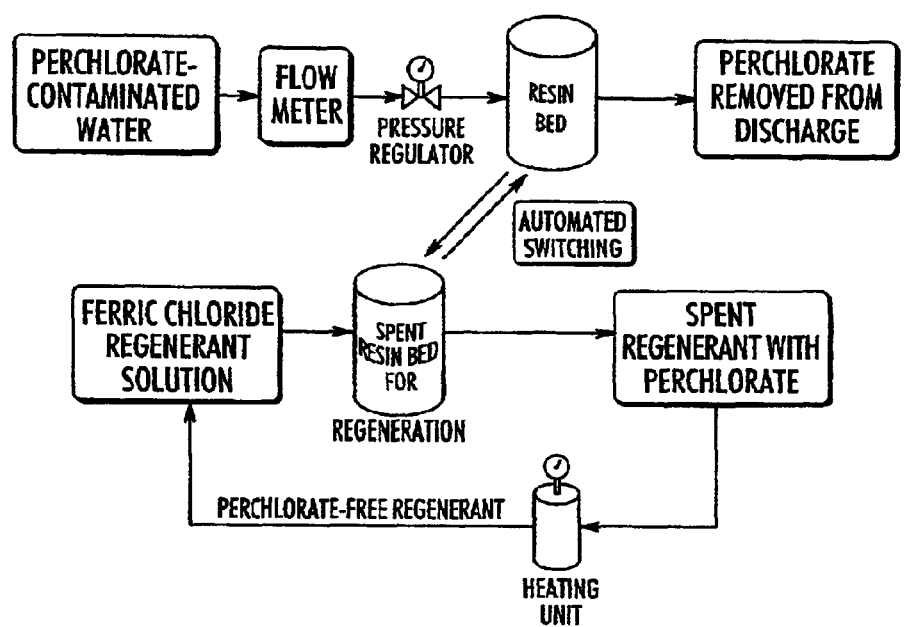
FIG. 1 is a generic flow diagram of a typical fixed resin bed (or column) treatment system for removing perchlorate from contaminated groundwater or surface water.

Our previous U.S. Pat. No. 6,448,299 disclosed a novel methodology to regenerate spent perchlorate-loaded resins using a combination of ferric chloride and hydrochoric acid solutions (Gu et al., Environ. Sci. Technol. 35, 3363–3368, 2001; Gu et al., Remediation, March 2002). The new methodology has been proven to be highly efficient with minimized secondary waste generation. In this new methodology, the regenerant is composed of 0.1–1 M $FeCl_3$ and about 1–4 M HCl, in which tetrachloroferrate ions form according to the following chemical equilibrium

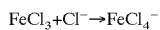

Tetrachloroferrate ions are large, poorly-hydrated anions, and like perchlorate, there is preferential sorption of these anions by strong-base anion-exchange resins. They can be used to displace perchlorate anions from the spent resin (loaded with perchlorate). Once perchlorate ions have been displaced, the resin column is washed with dilute HCl solution or water, in which tetrachloroferrate dissociates according to the following chemical equilibria:

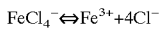

These positively charged ferric ion species and excess Cl⁻ anions are readily eluted off the resin column by charge repulsion, and the anion exchange resin is therefore regenerated to its original state with Cl⁻ as the counter ion by charge balance.

The entire regeneration process produces a relatively small quantity of regenerant wastes with a high perchlorate concentration. As indicated, the need still exists for a method to completely destroy perchlorate in this acidic regenerant solution, because of the hazardous nature and volume of the waste. It also is desirable to recycle the regenerant solution, provided that the perchlorate-destruction methodology does not change the properties of the regenerant solution. Therefore, the secondary waste production may be eliminated.

We have discovered that the perchlorate-containing regenerant may be treated to destroy perchlorate while not affecting the $FeCl_3$/HCl active components. This allows repeated recycle of the regenerant while producing no toxic liquid or solid wastes. The destruction is accomplished by a redox reaction using a water-miscible organic solvent or ferrous chloride.

A non-toxic catalyst such as the V(II)/V(III)/V(IV) redox couples could be used to accelerate the destruction of perchlorate at a relatively low temperature. The overall chemical reactions and equilibrium are described in the following equations (using ethanol as an example of the organic solvent). Note that none of the equations are stoichoimetrically balanced for the simplicity of illustration of these reactions.

In the absence of catalysts, ethanol ($CH_3CH_2OH$) is completely oxidized by ferric ions to water and carbon dioxide ($CO_2$). The partial redox reactions may be written as follows:

 (1)

 (2)

The ethanol could be oxidized stepwise with $CO_2$ and water as its end byproducts:

 (3)

The net reaction for reduced ferrous $Fe^{2+}$ is oxidation by perchlorate, which is reduced simultaneously to Cl⁻ and water, as shown in following equations:

 (4)

 (5)

This reaction likely involves a net two electron, oxygen atom transfer to form a Fe(IV)oxo (ferryl) species as an intermediate. The Fe(IV) species will react rapidly with Fe(II) to form Fe(III).

 (6)

Therefore, the overall reaction is the oxidation of ethanol and the reduction of perchlorate catalyzed by the Fe(III)/Fe(II) couple, with byproducts of Cl⁻, $CO_2$, and $H_2O$, none of which are hazardous. Ferrous ions (such $FeCl_2$) can be used to directly reduce perchlorate (without addition of organic alcohols), with byproducts of ferric ions. An important aspect of this invention is that the chemical properties and compositions of the regenerant solution remain essentially intact after treatment because both ferric ions and chloride are the components of the regenerant solution while $CO_2$ is volatilized (when organic alcohol is used). This allows reuse of the regenerant solution for multiple cycles.

Another important aspect of this invention is that only a small and calculated amount of ethanol or other organic solvents or ferrous chloride may be used under controlled temperature so that the perchlorate destruction process does not generate unwanted byproducts. For example, with excess amounts of ethanol, ferrous ions, or by using other organic solvents, some intermediate organic byproducts may form as illustrated in Equation 3. More importantly, excess amounts of $Fe^{2+}$ will also be reduced, with subsequent precipitation of a mixture of $Fe^{3+}/Fe^{2+}$ hydroxides. Therefore, control of the course of the reaction by monitoring and adjusting the amount of reducing agent is necessary.

In the presence of vanadium catalysts, the reaction may be accelerated, and a lower heating temperature may be used because of the ability of vanadium or titanium to extract oxygen from oxyanions such as perchlorate. The overall reaction may follow the order of (1) ferric $Fe^{3+}$ is first reduced by ethanol, (2) V(IV) is concurrently reduced by ethanol, and (3) perchlorate is reduced by V(III). The first reaction has been illustrated in Equations (1) and (2), and the second in reactions (7) and (2). The net reaction of perchlorate with V(IV) is shown in equation (8) below:

$$VO^{2+} + e^- + 2H^+ \rightarrow H_2O + V^{3+} \qquad (7)$$

$$ClO_4^- + V^{3+} \rightarrow V(IV)O^2 + Cl^- + H_2O \qquad (8)$$

Isopropanol appears to be more effective in degrading perchlorate. A number of other water soluble reducing agents are suitable for this application. Alcohols such as a methanol, ethanol, n-propanol, iso-propanol, n-butanol, sec-butanol, tert-butanol, and water soluble homologues, glycols such as ethylene glycol, such as ethylene glycol, propylene glycol, glymes such EGMME and EGDME, and amino alcohols such as ethanolamine are usable.

The reduction of perchlorate proceeds slowly at room temperature but with increasing rapidity at elevated temperatures and in the presence of catalysts. Higher temperatures result in faster rates but increased pressures and a more aggressive mixture. For this reason, the decomposition of perchlorate according to this method is best performed either in a pressure vessel/reactor or in a continuous-flow reactor within which a coiled tube is maintained at or heated to the desired temperature so that perchlorate is completely decomposed as the spent regenerant solution passes through the coiled reactor or in a continuous flow stirred tank reactor. The coiled reactor tube must have a long enough flow path to allow a sufficient reaction time (typically a few hours) to drive the decomposition of perchlorate to completeness or near completeness. The flow-through reactor can also be used in a recycle mode as well in which unreacted perchlorate-containing solution is returned for a second pass through the reaction zone. In the case of a batch reactor, a jacketed reactor is preferred. Because the hot mixture of HCl and $ClO_4^-$ is very aggressive, the metal reactor is preferably lined with glass or a fluorocarbon such as PTFE. The reactor may be heated using resistance wire, steam or hot oil, the later being preferred for a batch reactor.

Figure 2:
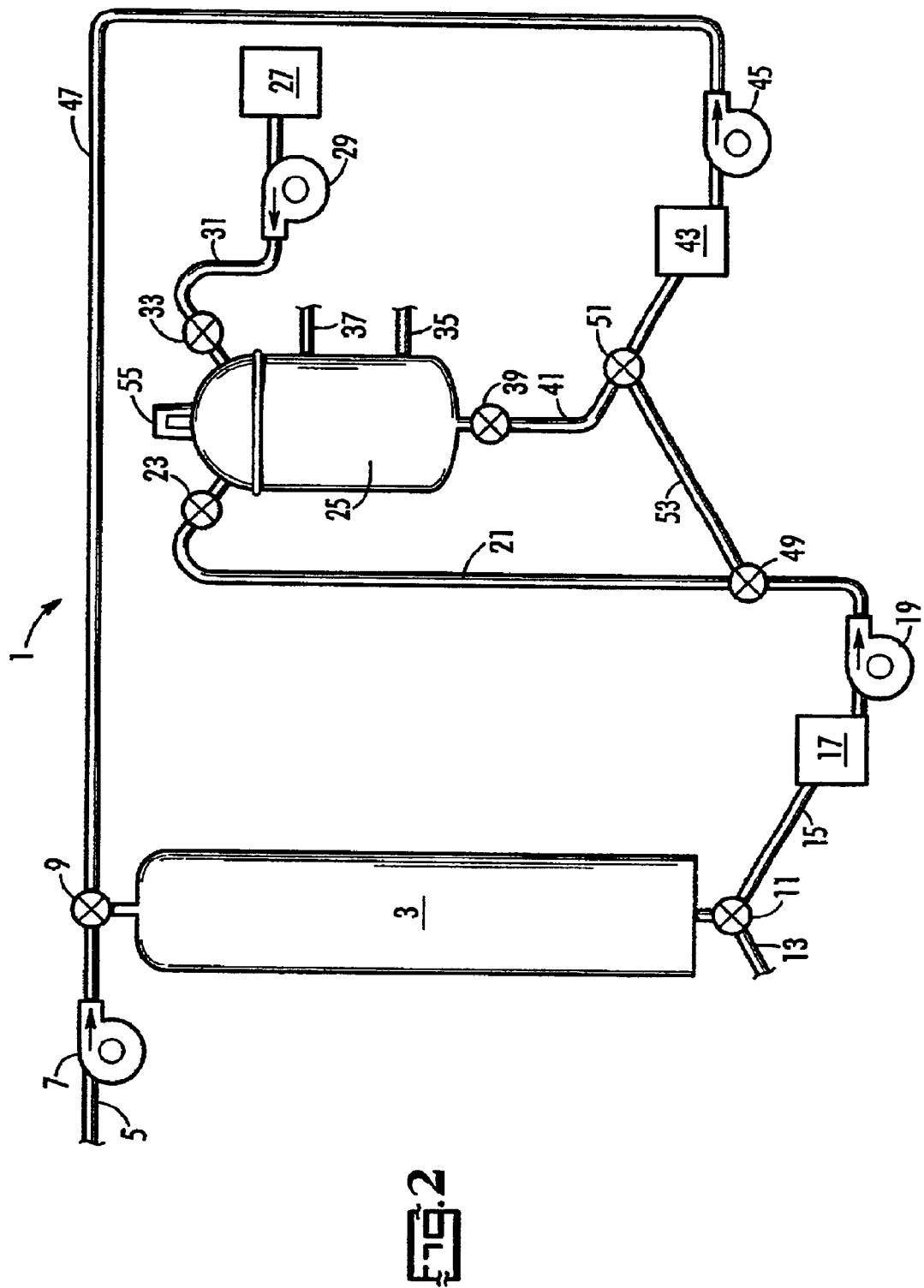
FIG. 2 is a schematic of the water purification and regeneration system according to this invention.

FIG. 2 shows one embodiment of a perchlorate removal system with resin regeneration and regenerant recovery. Contaminated water such as groundwater or well water enters the system through pipe 5 and is pumped to column 3 which is packed with resin. Switch valve 9 admits the water or regenerant. Treated water passes through valve 11 into drain pipe 13 for subsequent use.

When the resin is to be regenerated, valve 9 is switched to open pipe 47, pump 7 is turned off or the contaminated water is redirected to another column. Valve 11 is switched to direct effluent to pipe 15. Pump 45 is activated to pump regenerant solution from tank 43 into the column 3. The effluent passes through pipe 15 to a holding tank 17. The contents of tank 17 may be pumped using pump 19 and valves 49 and 51 to refill tank 43. Simultaneously or alternatively, the regenerant may be pumped via pipe 21 and valve 23 into lined reactor 25. Reducing agent is pumped into the reactor via line 31 and valve 33 from tank 27 using pump 29 and pipe 31. The reactor can be heated using inlet 35 and outlet 37, which may be electrical wires, steam or oil pipes. The source of heat is not shown. If used, a stirring motor 55 is activated. In the case of a batch reactor, the mixture of regenerant and reductant are allowed to react for a period of time. If a coiled tube is used, flow rate is controlled to achieve the desired residence time. The treated regenerant is preferably cooled and drained through valve 39 and pipe 41 to tank 43, where it may be held until further needed and maybe adjusted using $FeCl_3$ and HCl to obtain optimal concentrations for regeneration.

The tanks, pipes and valves may be lined to reduce corrosion. When two or more columns are used, the regeneration system may be piped to serve all columns on a rotating basis. The regeneration system may be mounted on a skid or trailer and taken to different locations where contaminated water is being treated. Monitoring equipment such as UV-vis spectrophotometer or ion chromatographs may be permanently or temporarily installed for process control.

EXPERIMENTALS

Samples of spent $FeCl_3$/HCl regenerant solution were used for the study. This regenerant solution was obtained from the regeneration of a bifunctional anion exchange resin (Purolite D-3696) which had been used for groundwater treatment of perchlorate at Edwards Air Force Base, Calif. (Disclosed in Gu et al. *Remediation*, March 2002). The resin is the one described in U.S. Pat. No. 6,059,975 and the regeneration procedure is that described in U.S. Pat. No. 6,448,299. Perchlorate concentration in the regenerant solution ranged from ~6500 to 10,000 mg/L.

Aliquots of 0.5–10 ml of spent regenerant solution were mixed with an organic solvent at about 0.5 to 3% vol/vol or with ferrous chloride in order to study the relative effectiveness of these organic solvents in destroying perchlorate. These organic solvents included ethanol, isopropanol, citric acid, and acetate. Each mixture was placed either in an acid digestion bomb or in a glass tube. Samples were either held at ambient temperature (ca 25° C.) or heated in an oven to a specified temperature for a specified period of time.

The samples were then cooled, and an aliquot of sample was analyzed for $ClO_4^-$ content by ion chromatography. These data were used to calculate the extent of perchlorate destruction at varying experimental conditions as outlined above. The results are shown in Table 1. Isopropanol appeared to be one of the most effective organic solvents in decomposing perchlorate. About 100% decomposition of perchlorate was observed after heating the sample at ~170° C. for about 28 hours. Black precipitates were also observed in some cases, suggesting the reduction of $Fe^{3+}$ and the formation of $Fe^{3+}/Fe^{2+}$-mineral precipitates. In the presence of ethanol, a slightly higher temperature or a longer heating time is required to completely decompose perchlorate under the same experimental conditions. In the absence of an organic solvent or ferrous ion, the decomposition of perchlorate is extremely slow. Similarly, without ferric $Fe^{3+}$, no significant decomposition of perchlorate was observed, suggesting that the Fe(III)/Fe(II) may be acting as a redox couple in facilitating the reduction of perchlorate, as illustrated in Equations 2 and 4.

Figure 3:
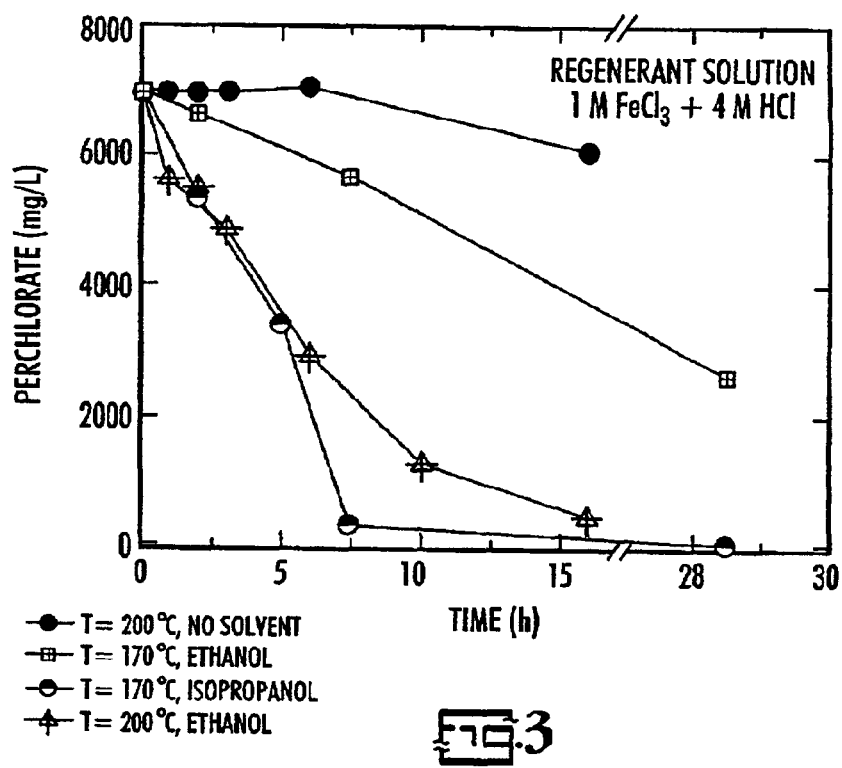
FIG. 3 is a plot of perchlorate remaining in a ferric chloride-hydrochloric acid regeneration solution versus time at different temperatures and using different organic solvents.

To study the rate of perchlorate decomposition at varying temperatures or in the presence of different organic solvents, the protocol above was repeated with samples taken at various times. The results are shown in FIG. 3 under conditions of (1) without organic solvent and (2) in the presence of ethanol or isopropanol at a temperature of either 170 or 200° C.

Figure 4:
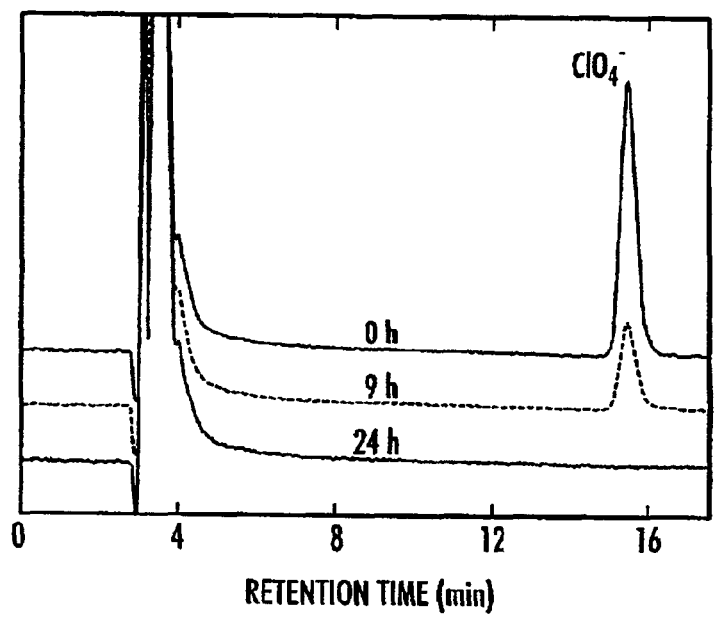
FIG. 4 shows ion chromatograms indicating a decrease in perchlorate concentration with increased heating time. Note that no byproducts such as chlorate or chlorite were identified, which would otherwise shown in the chromatograms (with a shorter retention time).
Figure 5:
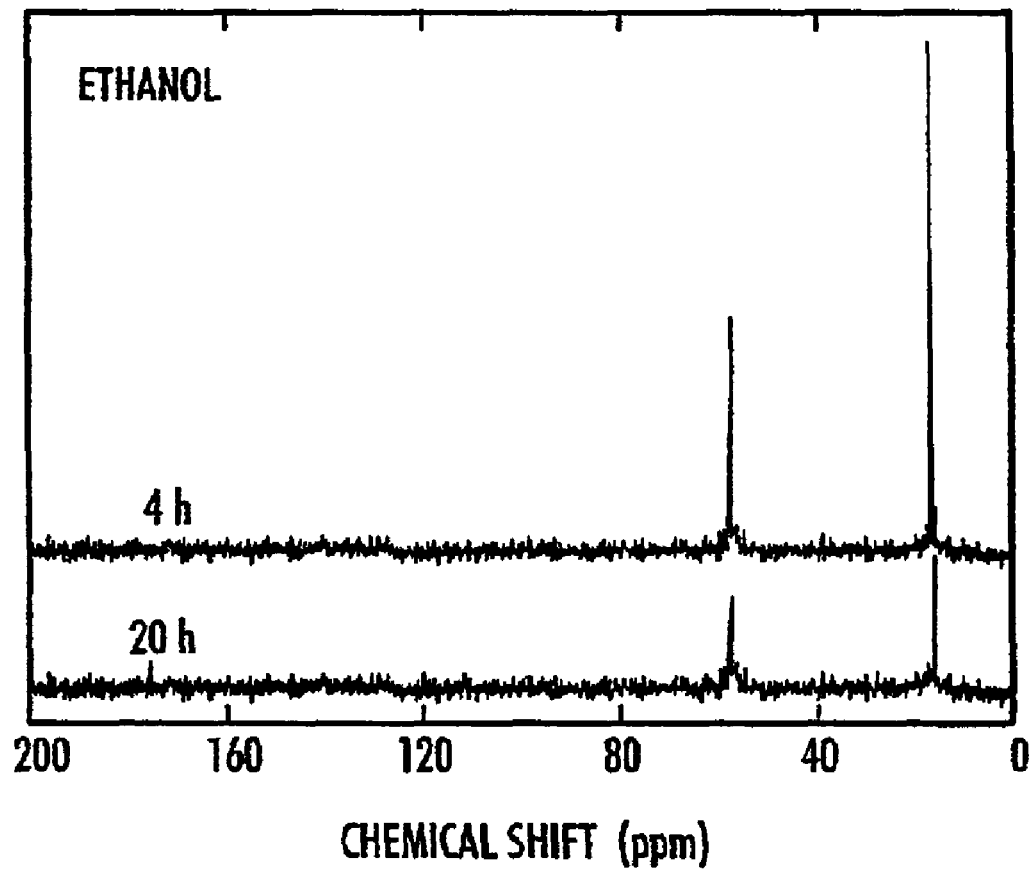
FIG. 5 shows $^{13}$C-liquid NMR spectra of regenerate solutions after 4 hours and 20 hours of heat treatment in the presence of 3% ethanol. No organic byproducts were identified except ethanol.

To verify the completeness of perchlorate decomposition and any byproduct formation for the reaction, ion chromatography was used for the analysis of perchlorate ($ClO_4^-$), chlorate ($ClO_3^-$), and chlorite ($ClO_2^-$) (shown in FIG. 4). In addition, liquid-state $^{13}C$-nuclear magnetic resonance (NMR) spectroscopy was used to identify organic reactants or byproducts (if any). FIG. 5 shows the NMR spectra of regenerant sample solutions that had been heated at ~190° C. for 4 and 20 hours in the presence of 3% of ethanol (vol/vol). Prior to analysis, samples were neutralized with NaOH after heat treatment in order to remove ferric ions, which may interfere with the analysis and identification of organic byproducts by NMR technique. The peaks corresponding to the methyl (—$CH_3$) and ethylene (—$CH_2$—) carbon atoms are seen to be diminished as the ethanol is converted to $CO_2$ and out gassed from the liquid.

INDUSTRIAL APPLICABILITY

The process of this invention is useful in the treatment of surface water (such as lakes or rivers) and groundwater plumes (such as well water) for either drinking purposes by mammals or agricultural irrigation. The method is also useful for the remediation of contaminated areas prior to commercial or residential development. It may be applied also in the decommissioning of the Air Force base or army ammunition plant sites where the soil or groundwater are contaminated with perchlorate.

Changes and departures in this invention may be made by those skilled in the art without departing from the spirit and scope thereof. Therefore, the invention is not intended to be limited by the description and figures but are those as set forth in the following claims.

TABLE 1

Destruction of perchlorate in $FeCl_3$/HCL regenerant solution at varying experimental condition. The regenerant solution had been used for the regeneration of the bifunctional anion-exchange resin columns used for groundwater treatment at an Air Force Base in California.

| Initial $ClO_4$ Concentration (mg/L) | Heating temperature (° C.)* | Heating time (h) | Reductant (<1% v/v) | Final $ClO_4$ Concentration (mg/L) | Perchlorate destroyed (%) |
|---|---|---|---|---|---|
| 8325 | Ambient | >100 | Ethanol | 8325 | 0 |
| 8325 | 280 | 5 | Ethanol | 0 | 100 |
| 6940 | Ambient | >100 | Ethanol | 6940 | 0 |
| 6940 | 200 | 20 | Ethanol | 0 | 100 |
| 6940 | 170 | 15 | Ethanol | 5934 | 15 |
| 6940 | 170 | 28.5 | Ethanol | 2640 | 62 |
| 6940 | 200 | 18 | None | 5800 | 16 |
| 6940 | 200 | 19 | Citric acid | 4320 | 38 |
| 6940 | 200 | 19 | Acetate | 592 | 15 |
| 6940 | 200 | 19 | Isopropanol | 0 | 100 |
| 6940 | 170 | 5 | Isopropanol | 3360 | 52 |
| 11000 | 190 | 15 | $FeCl_2$ | 590 | 95 |
| 9400 | Ambient | 24 | $FeCl_2$ | 9400 | 0 |
| 9400 | 170 | 24 | $FeCl_2$ | 590 | 94 |

*Temperature may vary ±5° C.

We claim:

1. A method for the decomposition of perchlorate in an aqueous solution of ferric chloride and hydrochloric acid, the method comprising:

mixing the aqueous solution with a reagent selected from the group consisting of an organic solvent, ferrous ion and mixtures thereof; and, maintaining the mixture in a closed container at a temperature and for a time sufficient to decompose the perchlorate.

2. A method for the decomposition of perchlorate according to claim 1 wherein the organic solvent is selected from the group consisting of organic alcohols and amino alcohols.

3. A method according to claim 2 wherein the organic alcohols are selected from the group consisting of methanol, ethanol, n-propanol, i-propanol, n-butanol, sec-butanol t-butanol, glycols and alkyl ethers of glycols.

4. A method according to claim 2 wherein said organic solvent concentration is from 0 to 5% (voL/vol).

5. A method according to claim 1 wherein said ferrous ion concentration is from 0.01 to 20% (wt/vol).

6. The method according to claim 1 wherein the temperature is maintained from ambient temperature up to about 300° C.

7. The method according to claim 6 wherein the heating time depends upon the temperature above ambient temperature.

8. A method according to claim 1 further comprising a catalyst.

9. A method according to claim 6 wherein the catalyst is selected from the group consisting ov V(IV) and V(III).

10. A method according to claim 1 which is performed in a batch process.

11. A method according to claim 1 which is performed in a continuous flow reactor.

12. A method according to claim 1 which is performed in a continuous flow reactor with recycle.

13. A method according to claim 1 which is used to process a regenerant solution from an anion exchange resin column used to treat perchlorate-contaminated water.

* * * * *